United States Patent [19]
Hajek

[11] Patent Number: 5,360,368
[45] Date of Patent: Nov. 1, 1994

[54] WILD GAME DRESSING TOOL

[76] Inventor: Michael L. Hajek, 409 NE. 6th St., Staples, Minn. 56479

[21] Appl. No.: 832,940

[22] Filed: Feb. 10, 1992

[51] Int. Cl.$^5$ .............................................. A22B 5/06
[52] U.S. Cl. .............................................. 452/197
[58] Field of Search .................................. 452/197

[56] References Cited

U.S. PATENT DOCUMENTS 4,901,397  2/1990  Pursell et al. ................. 452/197

FOREIGN PATENT DOCUMENTS 27577    4/1921  Denmark ........................ 452/197
560296   9/1932  Germany ........................ 452/197
715898   1/1942  Germany ........................ 452/197

*Primary Examiner*—Willis Little

[57] ABSTRACT

A wild game dressing tool comprising two outwardly spaced apart hooks for field dressing a deer or the like, eliminating the need for reaching up into an animal's rib cage blindly, consequently eliminating excessive blood on the field dresser's arms and clothing, and most importantly reduces the risk of contracting lymes disease, 3 Claims, 2 Drawing Sheets

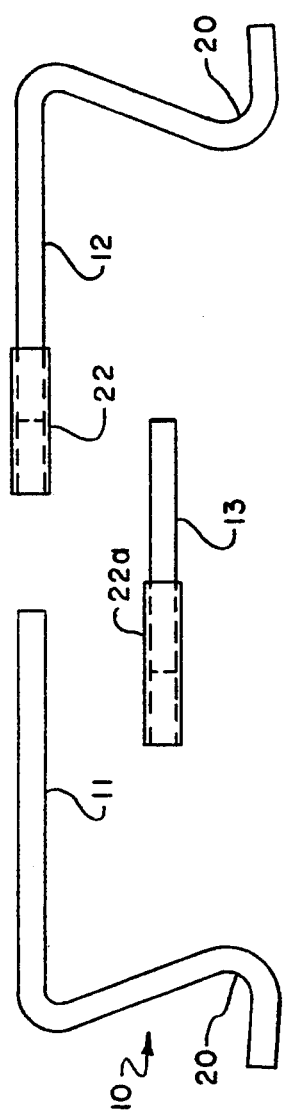
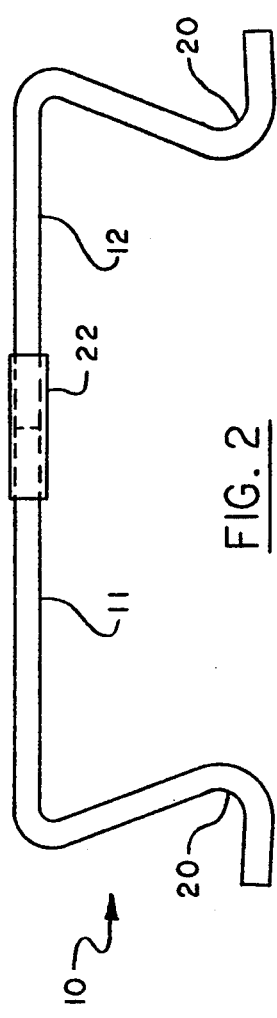
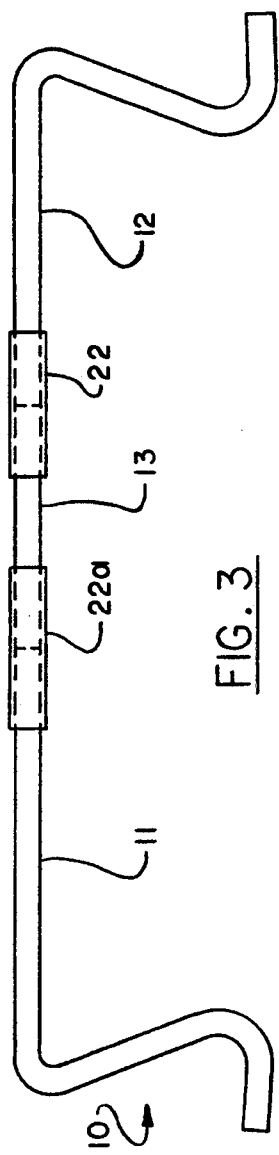

WILD GAME DRESSING TOOL

BACKGROUND OF THE INVENTION

The present invention relates generally to the art of dressing out big game wildlife, and in particular to the art of holding the ribs of the carcass apart while cleaning out the internal organs and while hanging the carcass for cooling.

In this art it is necessary to hold the carcass apart to stabilize the carcass to keep it from rolling and hold the rib cage apart in order to remove the internal organs. This allows the field dresser to see what is needed to be done and eliminates the need for the field dresser to reach up into the rib cage blindly thus eliminating excessive blood on the field dresser's arms and clothing. This is of considerable value to the field dresser as it reduces the risk of contracting lymes disease.

Techniques, such as the use of wooden sticks found in the near by brush, etc. have been used in effectively. Also, other methods have been to use two people, with each holding a leg which is also in-effective and combersome. Often times hunters are by themselves when they are hunting and would not have another person to help.

The present invention represents a major advance in the art of field dressing big game animals. In the past, hunters have not been able to field dress an animal without the help of another, or by use of archaic methods such as near by sticks, or by simply getting messy with blood from reaching up into an animal's internal rib cavity to remove the internal organs.

A disclosure document has been filed in the U.S. Patent Office under receipt number 277801.

SUMMARY OF THE INVENTION

An advantage of the present invention is that it provides a means of separating an animal's rib cage for the purpose of removing its internal organs.

Another advantage of the present invention is that it stabilizes the carcass by spreading an animal's shoulders to create a flattened wide base across the animals shoulder blades.

Another advantage of the present invention is that it offers a method of bracing the animal's rib cage apart while the carcass is cooling during the hanging process, The general operation of the present invention is described herein to provide an understanding of the overall invention. Simply, this is a device for use by a hunter in the field after having just slain an animal for game.

In the general operation of the present invention, after the game animal has been slain, the internal organs are exposed and the pelvic area is dressed. Then the brisket cartilage is cut from the lower rib cage to the base of the neck.

The applicant's device is then removed from the carrying pouch where it can be nested in place along with its extension and a knife, etc. While kneeling on one side of the animal, hold the tool in one hand, place one end of the tool against the brisket cartilage at its lowest point, opposite the side of the field dresser, place the other hand on the inside of the brisket cartilage closest to the kneeling field dresser. While pushing with the tool against the far side of the brisket cartilage, pull the near side of the brisket cartilage away from the far side far enough apart to allow the tool to serve as a brace for separating the rib cage. The curved design on the ends of the tool are such that they are oriented inward toward the animal's organ cavity, allowing the handle portion of the tool to be remote from the cavity to allow ample room for the field dresser's hands.

A feature of the present invention is its ability to be simply dismantled and stowed in nested fashion in a handy carry pouch, allowing other tools, such as a knife, flashlights, tool extension, etc., to be carried as well.

A further feature of the present invention is the curved ends which are designed to hook the edges of the brisket cartilage and then depart away from it in order to provide clearance room for the field dresser to perform work.

Another feature of the present invention is its ability to readily receive an extension and consequently be used on larger animals in exactly the same way.

An object of the present invention is to provide an easier and neater means of field dressing a big game animal.

It is anticipated that certain changes related to the size and shape and method of construction of the present invention can be made without appreciably departing from the present invention. It is also anticipated that certain components may be joined together or integrated to offer a variety of advantages without departing from the present invention.

BRIEF DESCRIPTION OF THE DRAWINGS

FIG. 1 is an exploded view of the present invention.

FIG. 2 is an assembled view of the preferred embodiment the present invention.

FIG. 3 is an assembled view of the present invention with an extension in place.

DETAILED DESCRIPTION OF THE PREFERRED EMBODIMENT

The present invention herein is generally described as a wild game dressing tool, 10, which, referring to FIG. 1, consists of three parts. The male end, 11, the female end, 12, and the extension, 13, make up the tool and are set up to easily receive one another. The male and female ends each posess a hook, 20, which is an integral part of each end. The female end is distinguished from the male end by a tubular coupling, 22, which is an integral part of the female end, 12. The extension is similar in that it also posesses a tubular coupling, 22a, which is an integral part of the extension, 13.

Figure 4:
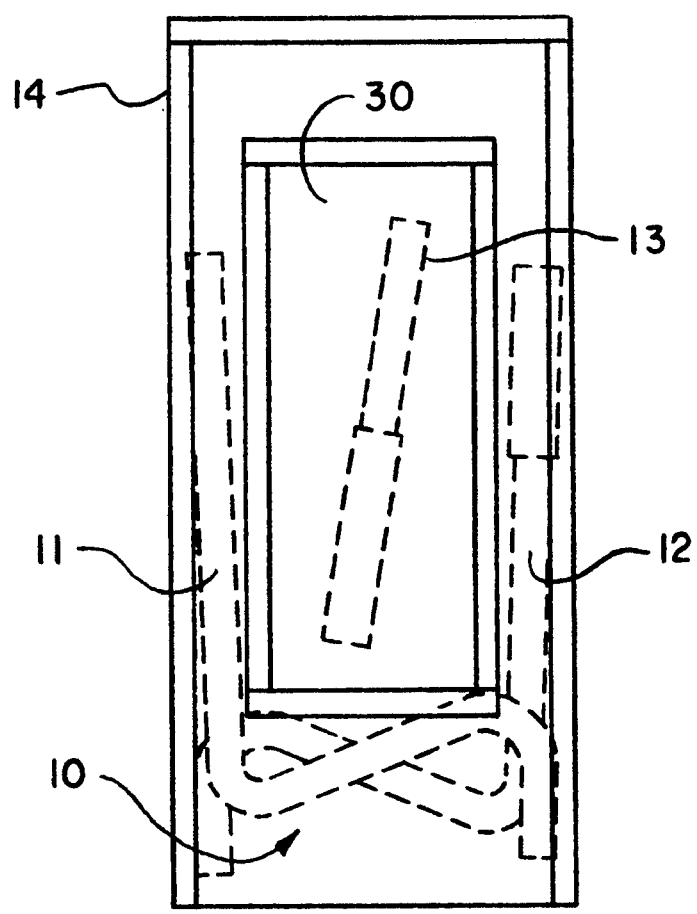
FIG. 4 is an unassembled view of the present invention as it would be nested and carried in its handy carrying pouch that can hang from the hunter's belt.
Figure 5:
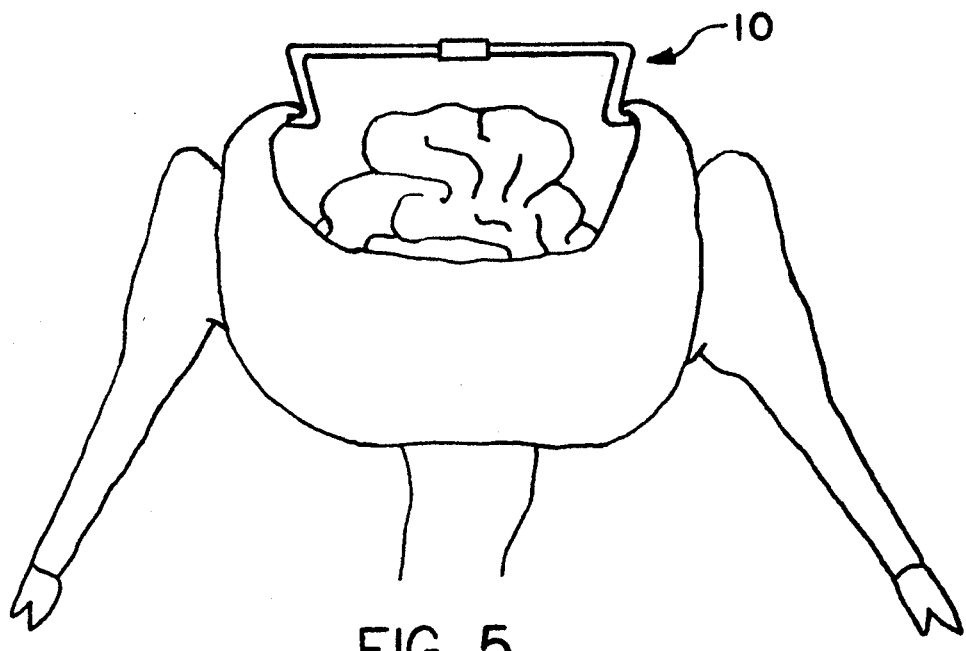
FIG. 5 is a perspective view of the present invention as it is being used and applied.

Referring to FIG. 4, the tool can be carried and nested in a handy carrying case, 14, with the hooks, 20, of each the male and female ends oriented toward each other in the case, 14, causing the male and female ends to be oriented upward forming a carrying cavity, 30, which can be used for carrying such things as the extension, 13, as well as other hunting aids.

The male end, 11, fits into the female end, 12, or it can fit into the extension, 13, and the extension, 13, would then fit into the female end, 12, creating a handle like configuration. The tool assembly is then used to push an animal's carcass apart by engaging the distal side of the brisket cartilage at the lower end away from the animal's head, and forcing the carcass apart until the proximal side of the brisket cartilage can be engaged by the opposing tool hook. The animal's rib cage, being forced apart by the tool as it serves as a brace, then, holds the brace in engagement within itself and the two sides of the brisket cartilage of the rib cage. The rib cage provides the pressure required to do this.

That which is claimed is:

1. A wild game dressing tool comprising:

a first member having an elongated male end portion and a first offset hook portion; said male end portion and first hook portion being interconnected by an intermediate portion having curved opposite ends and extending at an acute angle relative to the male end and first hook portions, whereby said male end and first hook portions extend in parallel planes;

a second member having an elongated female end portion and a second offset hook portion; said female end portion and second hook portion being interconnected by an intermediate portion having curved opposite ends and extending at an acute angle relative to the female end and second hook portions, whereby said female end and second hook portions extend in parallel planes;

said first and second members being joined by coupling the male and female end portions to form a unitary tool, whereby the first and second hook portions extend in opposite directions for engaging the proximal and distal sides of an opened animal's carcass to force and hold the animal's rib cage apart.

2. The tool of claim 1, further comprising an elongated extension having opposed male and female end portions; said extension being coupled between the first and second members for increasing the distance between the first and second hook portions.

3. The tool of claim 1, wherein the ends of the first and second hook portions are blunt to prevent penetration through the animal's hide.

* * * * *